United States Patent [19]

Noailly

[11] Patent Number: 4,758,403
[45] Date of Patent: Jul. 19, 1988

[54] GRID WITH MIXING FINS FOR A NUCLEAR FUEL ASSEMBLY

[75] Inventor: Jean Noailly, Lyons, France

[73] Assignee: Fragema, Courbevoie, France

[21] Appl. No.: 795,299

[22] Filed: Nov. 5, 1985

[30] Foreign Application Priority Data

Nov. 5, 1984 [FR] France ............................ 84 16803

[51] Int. Cl.$^4$ ................................................ G21C 3/34
[52] U.S. Cl. .................... 376/439; 376/443; 376/454
[58] Field of Search .................... 376/439, 443, 454

[56] References Cited

U.S. PATENT DOCUMENTS

| | | | |
|---|---|---|---|
| 3,862,000 | 1/1975 | Pugh et al. ........................ | 376/439 |
| 4,224,107 | 9/1980 | Delafosse et al. . | |
| 4,576,786 | 3/1986 | De Mario ........................ | 376/443 X |

FOREIGN PATENT DOCUMENTS

| | | |
|---|---|---|
| 1564697 | 1/1970 | Fed. Rep. of Germany . |
| 2157742 | 5/1973 | Fed. Rep. of Germany ...... 376/439 |
| 1536258 | 8/1968 | France . |
| 2093981 | 3/1974 | France . |
| 2198221 | 2/1977 | France . |

Primary Examiner—John F. Terapane
Assistant Examiner—John S. Maples
Attorney, Agent, or Firm—Pollock, Vande Sande & Priddy

[57] ABSTRACT

A spacing grid is provided for a nuclear fuel assembly comprising two sets of intersecting metal plates having fins and defining fuel element receiving pockets. The plates comprise solely half-fins each associated with a single pocket of the grid, disposed in opposed pairs at the angles of the pockets, the half-fins of one pocket being placed at 90° from the half-fins of adjacent pockets.

4 Claims, 3 Drawing Sheets

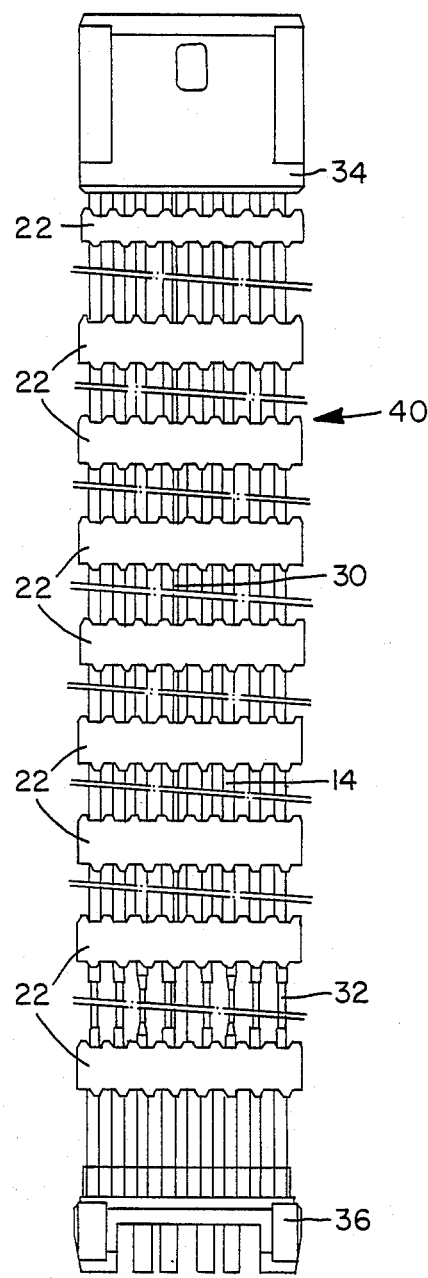

GRID WITH MIXING FINS FOR A NUCLEAR FUEL ASSEMBLY

FIELD OF THE INVENTION

The invention relates to fuel assemblies for nuclear reactors, particularly water cooled nuclear reactors, of the type comprising a bundle of fuel elements held in position at the nodal points of a regular network by grids spaced apart along the bundle and comprising two sets of intersecting metal plates having mixing fins for deflecting the flow of coolant in the assembly.

BACKGROUND OF THE INVENTION

Nuclear fuel assemblies for power reactors are designed and constructed for achieving the best possible compromise between requirements which are to a large extent contradictory. Neutron absorption by the material forming the structure and guiding the flow must be as low as possible. That leads to forming the sheath of the elements from a material having a low neutron capture cross-section and reducing as much as possible the skeleton supporting the elements of the assembly. In particular, the use of a solid peripheral casing about the bundle has been successfully dispensed with and the skeleton reduced practically to two end nozzles connected together by elongated elements and to grids spaced apart along the bundle and defining individual cells or openings for the elements.

Another result sought during design of the assemblies is to make the temperature of the sheaths as homogeneous as possible, i.e., to reduce the hot spots. For that purpose, the coolant flow should be homogeneous throughout the whole of the assembly. Mixing fins are provided to homogenize the flow and to reduce the temperature differences by causing a transverse redistribution of the coolant streams. But the fins should not increase the head loss to the extent that there would be an inacceptable reduction of the flow rate. Numerous grid patterns having mixing fins are already known. French Specification No. 2,198,221, for example, discloses a grid comprising fins which generate a vortex having a large diameter with respect to the spaces between fuel elements. French Specification No. 2,093,981 describes a grid whose fins are placed so as to induce a flow in the form of concentric currents, in alternating direction in the assembly. German Published Application No. 1,564,697 comprises half-fins having a distribution which induces a specific flow pattern but requires locating two half-fins at certain crossings while other crossings between two plates are completely devoid of fins.

To facilitate description of the invention and avoid any ambiguity, the following terminology will be adopted hereafter.

The term "constriction" will designate the position where two adjacent fuel elements are separated by the shortest distance. "Hydraulic cell" will designate the space between four constrictions defined by four adjacent fuel elements, whose axes occupy the nodal points of a square network. "Radial hydraulic balance" will designate the arithmetical sum of the flow rates which enter the hydraulic cell and leave it in the radial (as opposed to longitudinal) direction. A desired balance corresponds to a zero sum of the flows entering and leaving the cell perpendicularly to the general flow direction along the assembly.

The grids described in French Specifications Nos. 2,198,221 and 2,093,981 are unsatisfactory in that they generate a flow exhibiting a non-zero hydraulic balance in each cell. In addition, the volume of material constituting the fins changes from one hydraulic cell to the other in the grid described in French Specification No. 2,198,221 and German Published Application No. 1,564,697.

French Patent No. 1,536,256 describes a grid comprising fins placed in the constrictions. This choice is hydraulically unfavorble, for it further reduces the cross-sectional flow area offered to the coolant at a place where that area is already at a minimum.

Finally, French Patent No. 1,536,258 describes a grid comprising fins placed at the intersections of the crossed strips forming the grid. But, due to the longitudinal bulk of the fins, it is necessary to place them partly on one side of the grid and partly on the other side. Furthermore, the flow induced in the constrictions is very complex. The flow occurs from one grid to the next in the longitudinal direction of the assembly, in a form which, as seen in a plane perpendicular to the general flow, is in the form of crenellations. Finally, the radial hydraulic balance is not zero in the cells.

SUMMARY OF THE INVENTION

It is an object of the invention to provide an improved spacing grid with mixing grids for a fuel assembly; it is a more specific object to provide a grid having fins on only one side of the grid, achieving hydraulic homogeneity and homogeneous distribution of the fins in the grid, and consequently an absorption substantially equal for all hydraulic cells.

To arrive at this result, the invention starts from the discovery that it is advisable to make each hydraulic cell symmetrical with respect to its axis and to avoid at the same time the presence of fins in the constrictions.

According to the invention, a grid comprises a network of mixing fins formed from half-fins each placed on a single elementary pocket or opening and disposed in opposed pairs at the angles of the pockets, the half-fins of one pocket being placed at 90° from the half-fins of the adjacent pockets and each plate of the grid having at most one half-fin at each angle.

In an advantageous embodiment of the invention, the grids comprise half-fins placed in pairs in each pocket, situated at the intersections of the plates and disposed so as to achieve symmetry along the two diagonals of each elementary mesh of the network of fuel elements.

In all cases, with the arrangement of the invention an overall zero radial hydraulic balance is obtained in each hydraulic cell with two incoming flows and two outgoing flows. The amount of material represented by the half-fins is the same for all the hydraulic cells. There is direct circulation in the constrictions in both directions and the zones in which boiling generates a high void rate are swept. Due to this circulation with currents in perpendicular directions, the current intersections are transferred to the intersections of the plates, i.e. where the fluid stream is the widest.

In a simplified embodiment, there is only one half-fin per hydraulic cell. The half-fins remain orthogonal to each other when they pass from one hydraulic cell to the nearest cell and the diagonal symmetry of the flows is maintained, as well as direct sweep circulation in the constrictions.

BRIEF DESCRIPTION OF THE DRAWINGS

The invention will be better understood from the following description of particular embodiments, given by way of examples with reference to the accompanying drawings, in which:

FIG. 6 is a partial front view of an assembly having grids according to the Invention.

DESCRIPTION OF PREFERRED EMBODIMENTS

Figure 1:
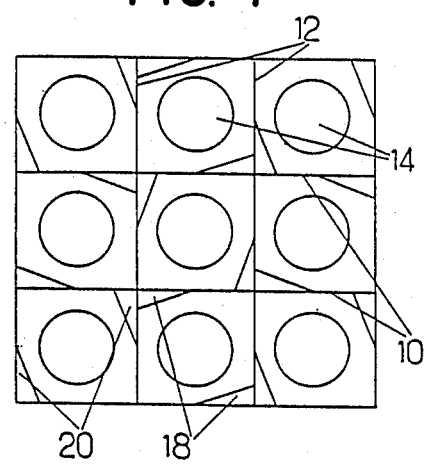
FIG. 1 is a general diagram seen in plan view, showing the distribution of half-fins in a gruop of nine pockets of a grid, according to one embodiment of the invention.
Figure 2:
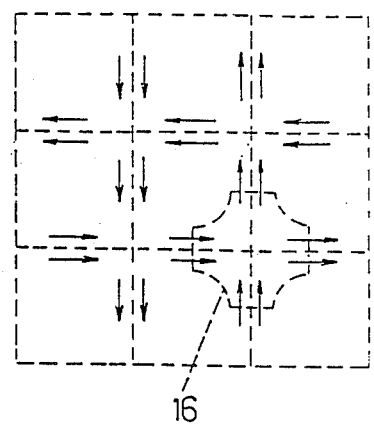
FIG. 2 is a diagram showing the flow distribution in the group of pockets of FIG. 1.

FIGS. 1 and 2 show schematically a fragment of a grid which comprises two intersecting sets of plates 10 and 12 defining pockets or openings for receiving elongate elements 14. The major part at least of these elements are fuel elements 30 as shown in FIG. 6. Others may be guide tubes 32 which slidably receive reactivity control and/or shim rods.

A plurality of such grids 22 will be distributed along the elongate elements and secured to the guide tubes 32. The guide tubes 32 and end nozzles 34,36 secured thereto constitute a supporting structure of a fuel assembly 40.

Each grid pocket is provided with two half-fins, placed on the same side of the grid. Because each of these half-fins only concerns a single pocket, it is possible to place all the half-fins on the same side of the grid since they do not interfere with the assembly of the half-plates by lap joint intersection. The half-fins 18 oriented in one direction may be carried by plates 12, those 20 oriented in the perpendicular direction being carried by plates 10. Thus, each pocket comprises two opposite half-fins along one of its diagonals and at each intersection of two orthogonal plates are to be found two half-fins perpendicular to each other.

In FIG. 1 it can be seen that the amount of material represented by the half-fins is the same for all the pockets. This amount of material is also the same for all the hydraulic cells, such as cell 16 shown by broken lines in FIG. 2. The hydraulic balance is achieved in all the cells, except possibly for the edge cells, and comprises two incoming flows and two outgoing flows as can be seen in FIG. 2. Finally, there is direct circulation in the constrictions in two directions. The half-fins may be formed by simply bending flaps stamped in the plates before assembling these latter.

Figure 3:
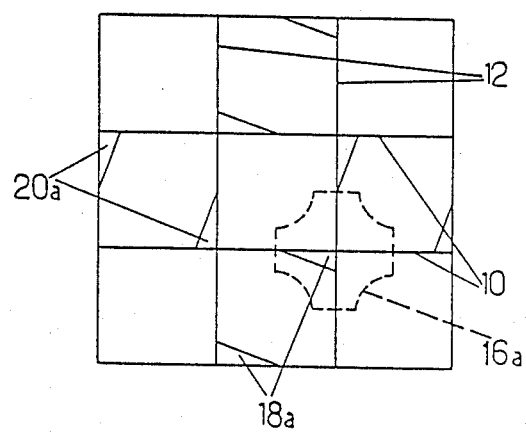
FIG. 3, similar to FIG. 1, shows a second embodiment.

In the variant shown in FIG. 3, each cell such as 16a only comprises a single half-fin 18a or 20a. The half-fins of two adjacent cells are orthogonal and the diagonal symmetry of the hydraulic flows is maintained. The hydraulic balance is maintained, with one incoming flow and one outgoing flow. The amount of material represented by the fins remains the same for all the hydraulic cells.

Figure 5:
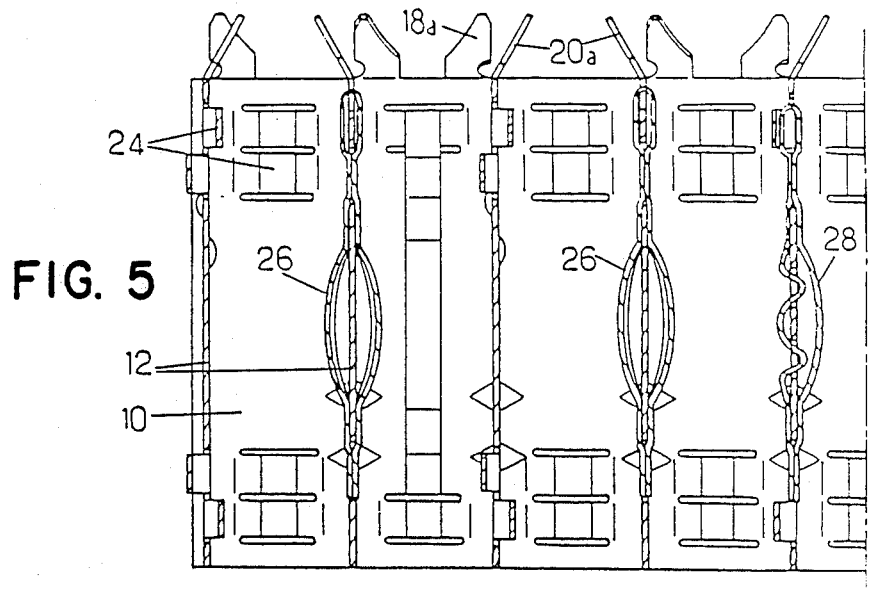
FIG. 5 is a sectional view through along line V—V of FIG. 4.
Figure 4:
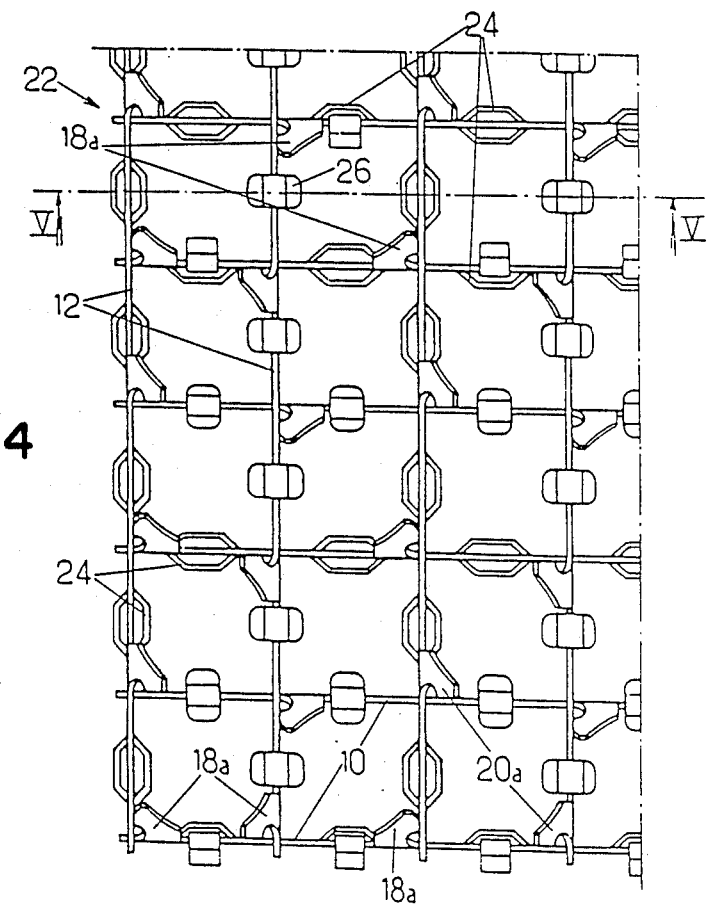
FIG. 4 is a plan view of a grid fraction incorporating the invention in the embodiment of FIG. 3.

FIGS. 4 and 5 show a possible grid construction corresponding to the diagram of FIG. 3. Grid 22 shown in these Figures has a general conventional construction. It comprises plates 10 and 12, generally made from a zirconium based alloy, assembled by lap jointing and welded at their intersection points. Each plate comprises fuel element bearing bosses 24 and different openings cooperating with springs for applying the elements against the bosses. In the case illustrated, these springs are inserted. Some of the springs, for example spring 26, are double and are inserted in straddling relation in indentations opening in one of the edges of the plates. Other springs, such as spring 28, are single and so of dissymmetrical construction.

Grids of this kind are described in prior documents, particularly French Patent No. 82 17717.

The grid of FIGS. 4 and 5 comprises a half-fin per hydraulic cell. Each plate 10 carries half-fins 18a with a pitch double that of the pockets. All the half-fins of the same plate 10 are slanting in the same direction, opposite that of the half-fins of the two adjacent plates 10. The half-fins 18a are thus disposed in quincunx arrangement. One pocket out of two is thus provided with two half-fins 18a placed at the ends of its diagonal, at least the current part of the grid, and the pockets respectively provided with and devoid of fins are distributed in a checkerboard arrangement. This arrangement must sometimes be modified at the edge of the grids where certain half-fins 18a may have a reversed arrangement, symmetrical with respect to the external plate.

The same arrangement is to be found for the half-fins 20a carried by plates 12.

The choice between the arrangement shown in FIG. 1 and that of FIGS. 3 to 5 will depend on the relative importance which is attached to homogenization of the mixture and reduction of pressure losses. In the case of a single half-fin per hydraulic cell, mixing of the fluid streams by deflection is not as complete, but on the other hand the pressure drop is appreciably reduced since the number of half-fins is reduced practically by half.

The invention is susceptible of numerous variants and it applies to grids of very varied construction. In particular, the invention may be used when the springs for holding the fuel elements in the grids are formed by parts stamped out from the plates, as is described for example in French Patent No. 1,536,258.

I claim:

1. In a nuclear fuel assembly having fuel elements, a spacing grid with mixing fins comprising two intersecting sets each consisting of a plurality of metal plates defining pockets distributed at the nodal points of a square network, the improvement wherein said plates comprise solely half-fins each relating to a single pocket of the grid, disposed in opposed pairs at the angles of the pockets, the half-fins of one pocket being placed at 90° from the half-fins of adjacent pockets, and wherein hydraulic cells are each defined by the fuel elements occupying four adjacent pockets and each cell has only a single half-fin, orthogonal to the half-fins placed in the nearest hydraulic cells.

2. The grid according to claim 1, wherein the half-fins are formed by bent fingers integral with the plates and disposed on a single side of the grid.

3. The grid according to claim 1, wherein some of the half-fins, placed at the edge of the grid, have a reversed arrangement with respect to that of the other half-fins.

4. A spacing grid with mixing fins for a nuclear fuel assembly, comprising two intersecting sets each consisting of a plurality of metal plates defining pockets, distributed at the nodal points of a square network, according to claim 1, wherein every other one of said pockets is provided with half-fins and the pockets respectively provided with and devoid of fins are distributed in a checker board arrangement.

* * * * *